United States Patent
Ramisetti et al.

(10) Patent No.: US 12,455,088 B2
(45) Date of Patent: Oct. 28, 2025

(54) OPERATION OF ENVIRONMENTAL CONTROL SYSTEM DURING THERMOSTAT FAILURE

(71) Applicant: Carrier Corporation, Palm Beach Gardens, FL (US)

(72) Inventors: Srinivas Ramisetti, Telangana (IN); Ravi Kumar Kandhi, Telangana (IN); Ramakrishna Bodepudi, Telangana (IN)

(73) Assignee: CARRIER CORPORATION, Palm Beach Gardens, FL (US)

( * ) Notice: Subject to any disclaimer, the term of this patent is extended or adjusted under 35 U.S.C. 154(b) by 238 days.

(21) Appl. No.: 18/312,900

(22) Filed: May 5, 2023

(65) Prior Publication Data

US 2023/0358424 A1    Nov. 9, 2023

Related U.S. Application Data

(60) Provisional application No. 63/339,747, filed on May 9, 2022.

(51) Int. Cl.
*F24F 11/32*    (2018.01)

(52) U.S. Cl.
CPC .................. *F24F 11/32* (2018.01)

(58) Field of Classification Search
CPC .. F24F 11/32; F24F 11/54; F24F 11/56; F24F 11/38
See application file for complete search history.

(56) References Cited

U.S. PATENT DOCUMENTS

| | | | |
|---|---|---|---|
| 7,992,794 B2* | 8/2011 | Leen .................. | G05D 23/1931 236/94 |
| 8,740,101 B2* | 6/2014 | Leen ........................ | F24F 11/77 236/94 |
| 10,408,487 B1* | 9/2019 | Berman .................... | F24F 11/63 |
| 10,423,142 B2* | 9/2019 | Poplawski ............... | F24F 11/62 |
| 2013/0186613 A1* | 7/2013 | Estiban .................... | F24F 11/38 165/253 |
| 2016/0102877 A1* | 4/2016 | Griffin .................... | F24F 11/38 700/276 |

\* cited by examiner

*Primary Examiner* — Marc E Norman
(74) *Attorney, Agent, or Firm* — CANTOR COLBURN LLP

(57) ABSTRACT

A method of operating an environmental control system, the method including at a thermostat, identifying a controller in the environmental control system as a secondary controller; training the secondary controller by transferring setpoints from the thermostat to the secondary controller; detecting a failure in the thermostat indicating that the thermostat no longer controlling the environmental control system; in response to the failure in the thermostat, controlling the environmental control system using the secondary controller.

14 Claims, 3 Drawing Sheets

OPERATION OF ENVIRONMENTAL CONTROL SYSTEM DURING THERMOSTAT FAILURE

CROSS-REFERENCE TO RELATED APPLICATIONS

This application claims the benefit of U.S. Provisional Application No. 63/339,747 filed May 9, 2022, all of which are incorporated herein by reference in their entirety.

BACKGROUND

Embodiments of the present disclosure relate to environmental control systems.

A typical environmental control system provides heating and cooling to an area. A user will interact with a thermostat to enter setpoints corresponding to desired comfort levels, such as temperature and/or humidity. The thermostat provides control signals to other components of the environmental control system to meet the setpoints. If the thermostat experiences a failure, the environmental control system is not operational, which leads to user discomfort and dissatisfaction.

BRIEF DESCRIPTION

According to an embodiment, a method of operating an environmental control system includes at a thermostat, identifying a controller in the environmental control system as a secondary controller; training the secondary controller by transferring setpoints from the thermostat to the secondary controller; detecting a failure in the thermostat indicating that the thermostat no longer controlling the environmental control system; in response to the failure in the thermostat, controlling the environmental control system using the secondary controller.

In addition to one or more of the features described above, or as an alternative to any of the foregoing embodiments may include upon resolution of the failure in the thermostat, controlling the environmental control system using the thermostat.

In addition to one or more of the features described above, or as an alternative to any of the foregoing embodiments may include wherein the thermostat identifies the secondary controller in response to at least one of a processor and memory at the controller.

In addition to one or more of the features described above, or as an alternative to any of the foregoing embodiments may include wherein the thermostat transfers the setpoints to the secondary controller periodically.

In addition to one or more of the features described above, or as an alternative to any of the foregoing embodiments may include wherein the thermostat transfers the setpoints to the secondary controller upon a change in a setpoint of the setpoints.

In addition to one or more of the features described above, or as an alternative to any of the foregoing embodiments may include wherein the detecting the failure in the thermostat includes detecting a lack of communication between the secondary controller and the thermostat.

In addition to one or more of the features described above, or as an alternative to any of the foregoing embodiments may include wherein the detecting the failure in the thermostat includes the thermostat generating a failure message.

In addition to one or more of the features described above, or as an alternative to any of the foregoing embodiments may include wherein the secondary controller includes one of an indoor unit, an outdoor unit, a zone board and a zone sensor.

According to another embodiment, an environmental control system includes a thermostat; at least one component having a controller; the thermostat identifying the controller as a secondary controller; the thermostat training the secondary controller by transferring setpoints from the thermostat to the secondary controller; the secondary controller detecting a failure in the thermostat indicating that the thermostat no longer controlling the environmental control system; in response to the failure in the thermostat, the secondary controller controlling the environmental control system.

In addition to one or more of the features described above, or as an alternative to any of the foregoing embodiments may include wherein upon resolution of the failure in the thermostat, the thermostat resumes control of the environmental control system.

In addition to one or more of the features described above, or as an alternative to any of the foregoing embodiments may include wherein the thermostat identifies the secondary controller in response to at least one of a processor and memory at the controller.

In addition to one or more of the features described above, or as an alternative to any of the foregoing embodiments may include wherein the thermostat transfers the setpoints to the secondary controller periodically.

In addition to one or more of the features described above, or as an alternative to any of the foregoing embodiments may include wherein the thermostat transfers the setpoints to the secondary controller upon a change in a setpoint of the setpoints.

In addition to one or more of the features described above, or as an alternative to any of the foregoing embodiments may include wherein the detecting the failure in the thermostat includes detecting a lack of communication between the secondary controller and the thermostat.

In addition to one or more of the features described above, or as an alternative to any of the foregoing embodiments may include wherein the detecting the failure in the thermostat includes the thermostat generating a failure message.

In addition to one or more of the features described above, or as an alternative to any of the foregoing embodiments may include wherein the secondary controller includes one of an indoor unit, an outdoor unit, a zone board and a zone sensor.

Technical effects of embodiments of the present disclosure include the ability to operate an environmental control system when the thermostat experiences a failure.

The foregoing features and elements may be combined in various combinations without exclusivity, unless expressly indicated otherwise. These features and elements as well as the operation thereof will become more apparent in light of the following description and the accompanying drawings. It should be understood, however, that the following description and drawings are intended to be illustrative and explanatory in nature and non-limiting.

BRIEF DESCRIPTION OF THE DRAWINGS

The following descriptions should not be considered limiting in any way. With reference to the accompanying drawings, like elements are numbered alike.

DETAILED DESCRIPTION

Figure 1:
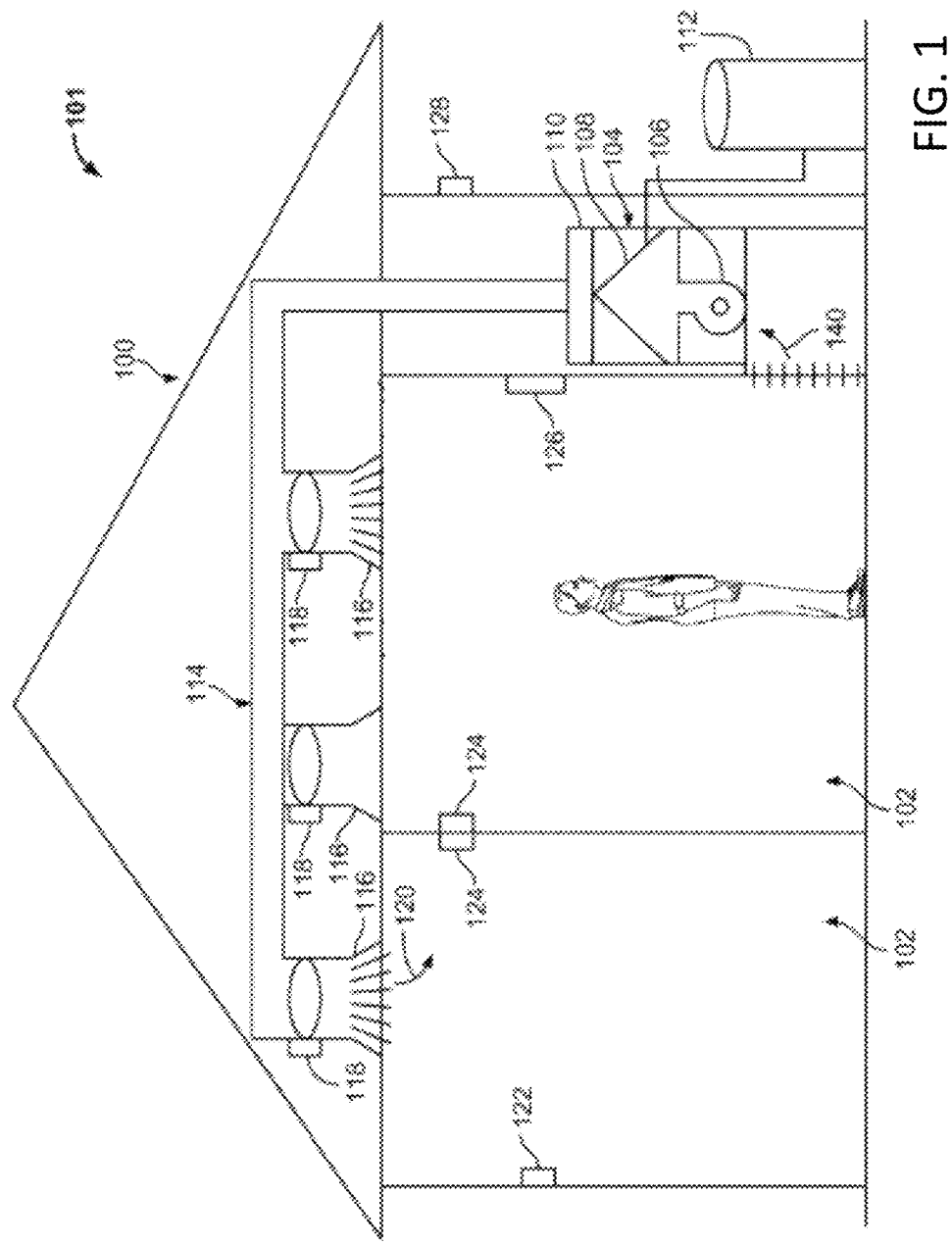
FIG. 1 depicts an indoor human-occupiable environment with an environmental control system according to an example embodiment.

Embodiments are directed to an environmental control system tor an indoor human-occupiable environment. FIG. 1 illustrates an example implementation of an environmental control system 101 for an indoor human-occupiable environment 100. Generally, the indoor human-occupiable environment 100 as shown in comprises a residential space, such as a house, townhome, trailer home, mobile home, or otherwise. However, in alternative aspects, the indoor human-occupiable environment 100 may be (and the concepts described. herein may be applied to) other spaces, such as apartments, condominiums, multi-family spaces, and commercial or industrial spaces.

Generally, the environmental control system 101 operates to deliver conditioned air to maintain the indoor human-occupiable environment 100 at a particular environmental condition, such as a particular temperature (or temperature range), a particular humidity (or humidity range), a particular temperature/humidity, combination, or other environmental condition. In some aspects, the particular environmental condition is set by a user to a desired setpoint or setpoint range. The environmental control system 101, as illustrated, includes an HVAC system comprising an air handling unit 104 (also referred to as an indoor unit), a condensing unit 112 (also referred to as an outdoor unit), one or more environmental sensors 122, and a thermostat (also referred to as a controller) 126. Although FIG. 1 illustrates a typical "split system" HVAC system, other HVAC systems are contemplated by the present disclosure as well, such as "packaged" HVAC systems, evaporative cooling HVAC systems (e.g., swamp coolers), and other HVAC systems, whether relying on mechanical refrigeration or not. Indeed, HVAC system that does not rely on mechanical refrigeration but delivers conditioned air to the indoor human-occupiable environment 100 is contemplated by the present disclosure.

The air handling unit 104 is operable to deliver a supply airflow 120 through a ductwork 114 to condition one or more rooms 102 of the indoor human-occupiable environment 100. The supply airflow 120, in this example, enters the rooms 102 through one or more ceiling mounted grilles 116 in fluid communication with the ductwork system 114. Return airflow 140, which has absorbed heat (e.g., sensible and/or latent) from, or transferred heat to, the air volume in the rooms 102, is circulated back to the air handling unit 104 for conditioning (e.g. cooling, heating, humidifying, dehumidifying).

Although FIG. 1 illustrates a typical, overhead air delivery system (e.g., ductwork connected to ceiling grilles), other airflow delivery systems are contemplated by the present disclosure. For example, underfloor air delivery systems (e.g., with ductwork positioned under a raised floor or supply airflow delivered to an open underfloor air plenum) are also contemplated by the present disclosure. Also, ductless systems, whether overhead or underfloor, may be used such that an attic or other space is used as an open supply air plenum to deliver the supply airflow 120 into the rooms 102. Other delivery systems, such as systems in which the supply airflow 102 is delivered from walls (e.g., window units, mini-split systems), floorboard areas (e.g., radiator systems) or otherwise are also within the present disclosure.

The illustrated air handling unit 104 includes a fan 106, a cooling coil 108 that is coupled (e.g., through liquid/vapor refrigerant conduits) to the condensing unit 112, and a heating coil 110 (e.g., water, electric, steam, or otherwise). The condensing unit 112 may include a compressor, heat exchanger and fan, as known in the art. Although the cooling coil 108 is illustrated as a DX (refrigerant) coil, other types of cooling coils are also within the scope of the present disclosure. For example, one alternative example of the air handling unit 104 includes a heat pump system, in which the coil 108 is both a cooling coil and heating coil (e.g., depending on season). Further, other components of the air handling unit 104, not shown here for simplicity sake, can include filters, humidifiers, dehumidifiers, and other components.

Supply airflow 120 is circulated through the ductwork 114 and, as shown in this example, may be modulated by airflow dampers 118 (e.g., motorized airflow dampers). Generally, each of the airflow dampers 118 may be adjusted (e.g., by the thermostat 126 or other controller) toward an open position for full supply airflow 120 and/or toward a closed position to block supply airflow 120. Although a 1:1 relationship between airflow dampers 118 and grilles 116 is shown in this example, not all grilles 116 may include an airflow damper 118 positioned nearby. Moreover, the airflow dampers 118 are shown as positioned in "branch" ductwork of the system 114, the dampers 118 (or additional dampers 118) may be mounted in the "trunk" ductwork. Although, generally, each airflow damper 118 may define a particular "zone" of the environmental control system 101, there may be multiple dampers 118 per designated zone (e.g., room 102, part of room 102, or collection of rooms 102), and there may be a single damper 118 that serves multiple rooms 102.

Each of the air handling unit 104 (and more particularly the fan 106) and the airflow dampers 118 may be considered an airflow control device. For example, as an airflow control device, the air handling unit 104 and/or airflow dampers 118 may control, modulate, or otherwise adjust a rate of the supply airflow 120. Further, the air handling unit 104 may, in combination with the condensing unit 112 or otherwise, control a temperature of the supply airflow 120. Thus, an airflow control device may control a flow rate and/or temperature of the supply airflow 120 from the grilles 116 and/or through the rooms 102.

Multiple environmental sensors 122 may be mounted within the rooms 102, e.g., one per room 102, more than one per room 102, or one sensor 122 per multiple rooms 102. Generally, the environmental sensors 122 are communicably coupled (e.g., wired or wirelessly) to the thermostat 126 and provide feedback (e.g., dynamic, real-time, near real-time or otherwise) to the thermostat 126 about one or more environmental parameters in the rooms 102. For example, the environmental sensors 122 may be temperature sensors. As another example, the environmental sensors 122 may be humidity sensors or combined temperature/humidity sensors. As another example, the environmental sensors 122 may be or include pressure sensors (e.g., barometric sensors or strain sensors). As yet another example, the environmental sensors 122 may be or include light sensors (e.g., ambient or otherwise). An outdoor sensor 128 may sense conditions such as temperature or humidity outside of the indoor human-occupiable environment 100. Of course, each environmental sensors 122 may be a combination of the aforementioned sensors.

As illustrated, multiple occupancy sensors 124 may be mounted within the rooms 102, e.g., one per room 102, more than one per room 102, or one sensor 124 per multiple rooms 102. Generally, the occupancy sensors 124 are communicably coupled (e.g., wired or wirelessly) to the thermostat 126 and provide feedback (e.g., dynamic, real-time, near real-time or otherwise) to the thermostat 126 about an occupancy state occupied or not occupied) of the rooms 102. For example, the occupancy sensors 124 may be motion sensors, cameras with occupancy recognition capability, or other form of occupancy sensor.

For example, in some implementations, the occupancy sensors 124 may employ occupancy recognition of particular users within the indoor human-occupiable environment 100 to optimize each user's comfort using a generated. environmental model of the environment 100. Individual recognition techniques, such as facial recognition or using wireless (e.g., Bluetooth™) localization with a personal phone, smartwatch, or fitness band, among others, may be used to determine not only whether a user is in a particular room 102, but which user is in the particular room 102.

In some implementations, the environmental sensors 122 and occupancy sensors 124 may be combined such that a single sensor includes the functionality of both the environmental sensors 122 and the occupancy sensors 124. Further, such combined sensors, as well as the environmental sensors 122 and/or occupancy sensors 124, may include location capability (e.g., through OPS or other form). Thus, in some implementations, each sensor combination sensor, environmental sensors 122 and/or occupancy sensors 124) may be able to communicate its position within a particular room 102 and within the indoor human-occupiable environment 100 generally, to the thermostat 126 (or other controller).

Figure 2:
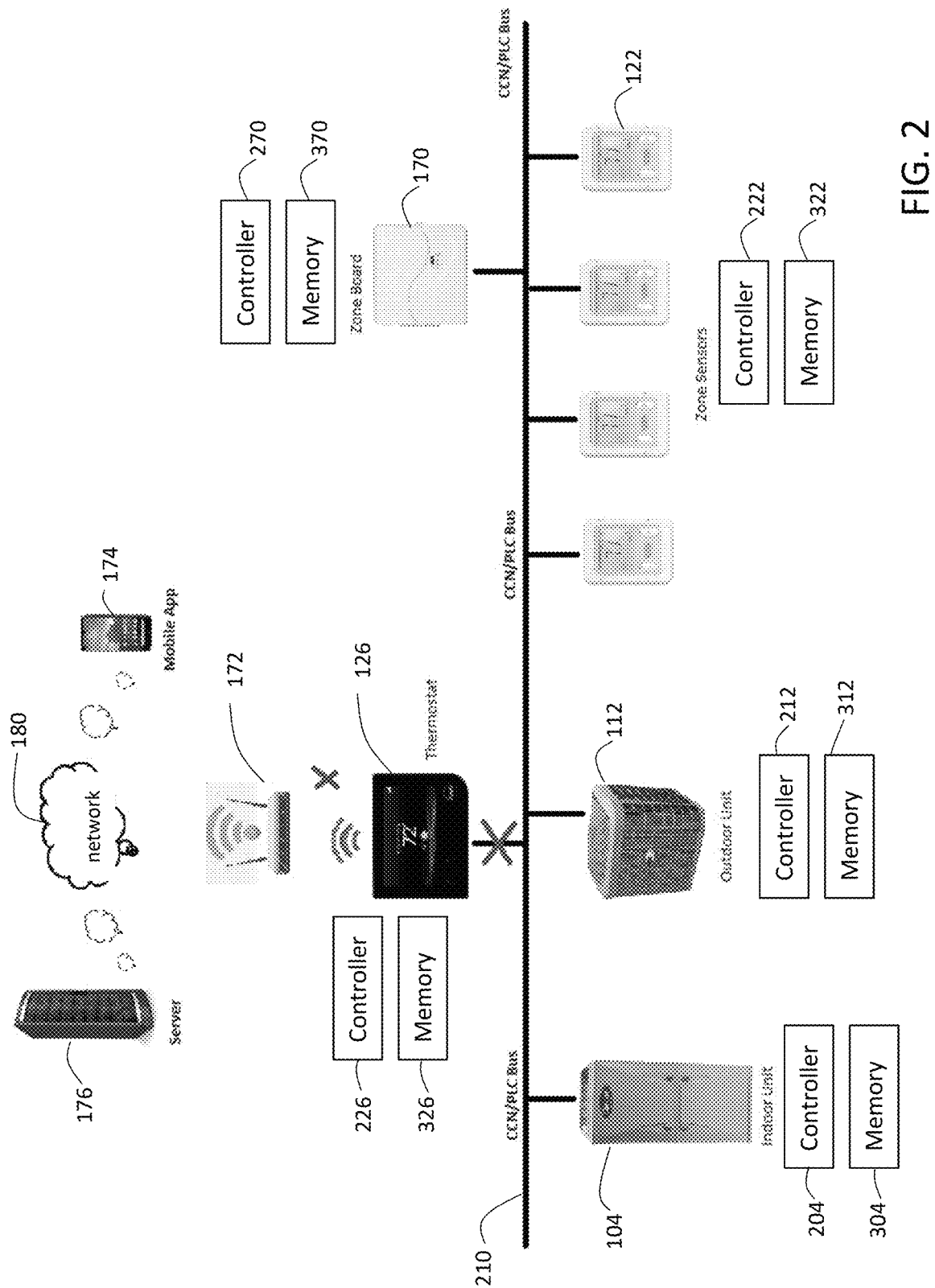
FIG. 2 depicts components of the environmental control system according to an example embodiment.

FIG. 2 illustrates connections of various components of the environmental control system 101. Components of the environmental control system 101 may communicate over a bus 210. The bus 210 may be a wired bus or a wireless bus. Example wired buses include the Carrier comfort network (CCN) and a power-line communication (PLC) bus. As shown in FIG. 2, the thermostat 126, the indoor unit 104, the outdoor unit 112, a zone board 230 and zone sensors 122 communicate over the bus 210.

The thermostat 126 includes a controller 226 and memory 326. The controller 226 may be implemented using a general-purpose microprocessor executing a computer program stored on a storage medium to perform the operations described herein. Alternatively, controller 226 may be implemented in hardware (e.g., ASIC, FPGA) or in a combination of hardware/software. Memory 326 may be internal to controller 226, or may be external memory such as RAM.

The indoor unit 104 includes a controller 204 and memory 304. The controller 204 may be implemented using a general-purpose microprocessor executing a computer program stored on a storage medium to perform the operations described herein. Alternatively, controller 204 may be implemented in hardware (e.g., ASIC, FPGA) or in a combination of hardware/software. Memory 304 may be internal to controller 204, or may be external memory such as RAM.

The outdoor unit 112 includes a controller 212 and memory 312. The controller 212 may be implemented using a general-purpose microprocessor executing a computer program stored on a storage medium to perform the operations described herein. Alternatively, controller 212 may be implemented in hardware (e.g., ASIC, FPGA) or in a combination of hardware/software. Memory 312 may be internal to controller 212, or may be external memory such as RAM.

A zone board 170 is used to configure and coordinate various zones in the indoor human-occupiable environment 100. A environmental sensor 122 may be located in each zone, to provide for heating and cooling at each respective zone. The zone board 170 includes a controller 270 and memory 370. The controller 270 may be implemented using a general-purpose microprocessor executing a computer program stored on a storage medium to perform the operations described herein. Alternatively, controller 270 may be implemented in hardware (e.g., ASIC, FPGA) or in a combination of hardware/software. Memory 370 may be internal to controller 270, or may be external memory such as RAM.

The zone sensors 122 each may include a controller 222 and memory 322. The controller 222 may be implemented using a general-purpose microprocessor executing a computer program stored on a storage medium to perform the operations described herein. Alternatively, controller 222 may be implemented in hardware (e.g., ASIC, FPGA) or in a combination of hardware/software. Memory 322 may be internal to controller 222, or may be external memory such as RAM.

The thermostat 126 may communicate with a gateway 172. The thermostat 126 may communicate with the gateway 172 over a wired connection or a wireless connection (e.g., 802.xx or WiFi, Bluetooth, etc.). The gateway 172 can communication with a mobile device 174 or a server 176 over a network 180. The network 180 may be implemented via one or more networks, such as, but are not limited to, one or more of WiMax, a Local Area Network (LAN), Wireless Local Area Network (WLAN), a Personal area network (PAN), a Campus area network (CAN), a Metropolitan area network (MAN), a Wide area network (WAN), a Wireless wide area network (WWAN), or any broadband network, and further enabled with technologies such as, by way of example, Global System for Mobile Communications (GSM), Personal Communications Service (PCS), Bluetooth, WiFi, Fixed Wireless Data, 2G, 2.5G, 3G (e.g., WCDMA/UMTS based 3G networks), 4G, IMT-Advanced, pre-4G, 5G, LTE Advanced, mobile WiMax, WiMax 2, WirelessMAN-Advanced networks, enhanced data rates for GSM evolution (EDGE), General packet radio service (GPRS), enhanced GPRS, iBurst, UMTS, HSPDA, HSUPA, HSPA, HSPA+, UMTS-TDD, 1xRTT, EV-DO, messaging protocols such as, TCP/IP, SMS, MMS, extensible messaging and presence protocol (XMPP), real time messaging protocol (RTMP), instant messaging and presence protocol (IMPP), instant messaging, USSD, IRC, or any other wireless data networks, broadband networks, or messaging protocols.

The application server 176 may be embodied as any type of processor-based computation or computer device capable of performing the functions described herein, including, without limitation, a computer, a server, a workstation, a desktop computer, a laptop computer, a notebook computer, a tablet computer, a mobile computing device, a wearable computing device, a network appliance, a web appliance, a distributed computing system (e.g., cloud computing), a processor-based system, and/or a consumer electronic device.

In operation, a user schedules demand on the environmental control system 101 by configuring one or more setpoints (e.g., temperature) in the thermostat 126. The thermostat 126 acts as primary controller and communicates with the indoor unit 104, outdoor unit 112, zone board 170, zone sensors 122, and other accessories of environmental control system 101 to service the demand. The thermostat 126 runs the demand based on the scheduling time until it is satisfied. The demand can also be initiated through a mobile app on mobile device 174. In case of thermostat 126 failure, the environmental control system 101 system cannot be operated.

Figure 3:
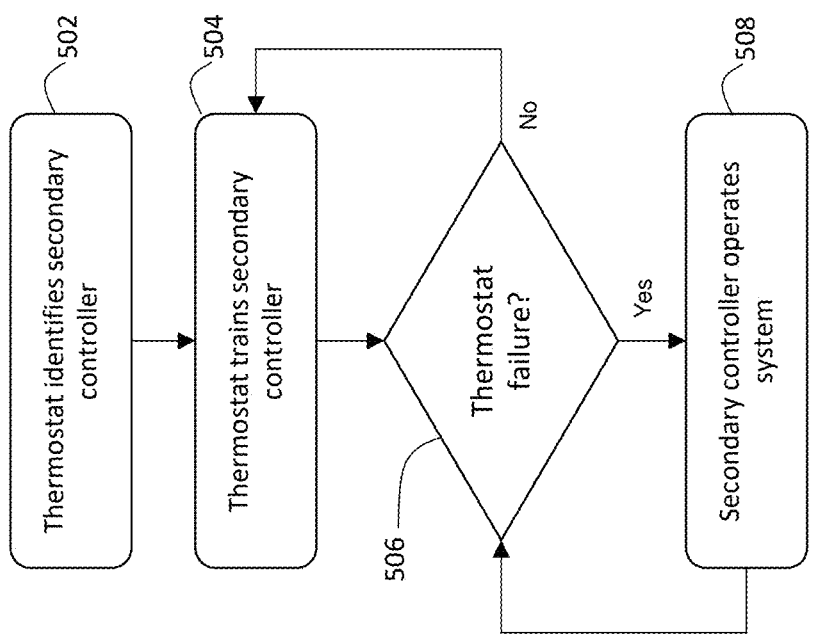
FIG. 3 is a flowchart of a process for operating the environmental control system according to an example embodiment.

FIG. 3 depicts a flowchart of a process for continuing operation of the environmental control system 101, even if the thermostat 126 experiences a failure. The process begins at 502 where the thermostat 126 identifies a controller to serve as a secondary controller. The thermostat 126 communicates with the various controllers 204, 212, 270 and 222 to determine which of the indoor unit 104, outdoor unit 112, zone board 170 or zone sensor 122 can serve as a secondary controller. The thermostat 126 may detect the type of processor installed at each controller 204, 212, 270 and 222 and type of size of memory 304, 312, 370 and/or 322. Based on the type of processor and/or memory available, the thermostat 126 assigns one of the controllers 204, 212, 270 and 222 as a secondary controller. For example, the zone sensors 122 may be equipped with more simple processors and small memory 322. In this scenario, the zone sensor would not make a suitable secondary controller. The indoor unit 104, for example, may have a more powerful processor and larger memory 304, and thus would be suitable as a secondary controller. In this example, the thermostat 126 designates the controller 204 of the indoor unit as the secondary controller.

At 504, the thermostat 126 trains the secondary controller by installing setpoints into the secondary controller. The setpoints may correspond to temperature/humidity settings and/or a schedule based on day of week, time of day, and operating modes (e.g., home, away, vacation). The setpoints installed in the secondary controller may be default setpoints or user-defined setpoints. The setpoints may be transferred from the thermostat 126 to the secondary controller periodically (e.g., every 5 minutes) or may be transferred when a change occurs at the thermostat 126 (e.g., change in setpoint or schedule). In this way, all setpoints in the thermostat 126 are installed into the secondary controller.

At 506, the secondary controller determines if the thermostat 126 has experienced a failure such that the thermostat 126 is no longer controlling the environmental control system 101. A thermostat failure may be determined by the secondary controller monitoring communication with the thermostat 126. A loss of communication on bus 210 indicates that the thermostat 126 has experienced a failure. A periodic heartbeat signal on the bus 210 may be generated by the thermostat 126, absence of which indicates a failure in the thermostat. In other embodiments, the thermostat 126 can generate a failure message on the bus 210 when the thermostat 126 is no longer controlling the environmental control system 101.

If the thermostat 126 has experiences a failure, the process returns to 504, where the thermostat 126 continues to train the secondary controller by installing setpoints into the secondary controller. If at 506, the thermostat 126 is experiencing a failure, flow proceeds to 508. At 508, the secondary controller controls the environmental control system 101 using the setpoints transferred from the thermostat 126. The process returns to 506, such that the secondary controller continues to operate the environmental control system 101 until the failure in the thermostat 126 is resolved.

Embodiments allow the environmental control system 101 to operate in accordance with user setpoints until the failed thermostat 126 is serviced/repaired. This reduces discomfort to user during peak demand hours reduces likelihood of user dissatisfaction with the system. Embodiments may be applied to both zoned and un-zoned systems. Further, no hardware changes are required and the implementation can be done in software.

As described above, embodiments can be in the form of processor-implemented processes and devices for practicing those processes, such as a controllers 226, 204, 212, 270 and/or 222. Embodiments can also be in the form of computer program code containing instructions embodied in tangible media, such as network cloud storage, SD cards, flash drives, floppy diskettes, CD ROMs, hard drives, or any other computer-readable storage medium, wherein, when the computer program code is loaded into and executed by a computer, the computer becomes a device for practicing the embodiments. Embodiments can also be in the form of computer program code, for example, whether stored in a storage medium, loaded into and/or executed by a computer, or transmitted over some transmission medium, loaded into and/or executed by a computer, or transmitted over some transmission medium, such as over electrical wiring or cabling, through fiber optics, or via electromagnetic radiation, wherein, when the computer program code is loaded into an executed by a computer, the computer becomes an device for practicing the embodiments. When implemented on a general-purpose microprocessor, the computer program code segments configure the microprocessor to create specific logic circuits.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A method of operating an environmental control system, the method comprising:
   at a thermostat, identifying a controller in the environmental control system as a secondary controller;
   training the secondary controller by transferring setpoints from the thermostat to the secondary controller;
   detecting a failure in the thermostat indicating that the thermostat no longer controlling the environmental control system;
   in response to the failure in the thermostat, controlling the environmental control system using the secondary controller;

wherein the thermostat identifies the secondary controller based on (i) a type of processor and (ii) a memory type or a memory size installed at each of a plurality of devices.

2. The method of claim 1, further comprising:
upon resolution of the failure in the thermostat, controlling the environmental control system using the thermostat.

3. The method of claim 1 wherein the thermostat transfers the setpoints to the secondary controller periodically.

4. The method of claim 1 wherein the thermostat transfers the setpoints to the secondary controller upon a change in a setpoint of the setpoints.

5. The method of claim 1 wherein the detecting the failure in the thermostat includes detecting a lack of communication between the secondary controller and the thermostat.

6. The method of claim 1 wherein the detecting the failure in the thermostat includes the thermostat generating a failure message.

7. The method of claim 1 wherein the secondary controller includes one of an indoor unit, an outdoor unit, a zone board and a zone sensor.

8. An environmental control system comprising:
a thermostat,
at least one component having a controller;
the thermostat identifying the controller as a secondary controller;
the thermostat training the secondary controller by transferring setpoints from the thermostat to the secondary controller;
the secondary controller detecting a failure in the thermostat indicating that the thermostat no longer controlling the environmental control system;
in response to the failure in the thermostat, the secondary controller controlling the environmental control system;
wherein the thermostat identifies the controller as the secondary controller based on (i) a type of processor and (ii) a memory type or a memory size installed at each of a plurality of devices.

9. The environmental control system of claim 8, wherein upon resolution of the failure in the thermostat, the thermostat resumes control of the environmental control system.

10. The environmental control system of claim 8 wherein the thermostat transfers the setpoints to the secondary controller periodically.

11. The environmental control system of claim 8 wherein the thermostat transfers the setpoints to the secondary controller upon a change in a setpoint of the setpoints.

12. The environmental control system of claim 8 wherein the detecting the failure in the thermostat includes detecting a lack of communication between the secondary controller and the thermostat.

13. The environmental control system of claim 8 wherein the detecting the failure in the thermostat includes the thermostat generating a failure message.

14. The environmental control system of claim 8 wherein the secondary controller includes one of an indoor unit, an outdoor unit, a zone board and a zone sensor.

* * * * *